(12) United States Patent
Nelson et al.

(10) Patent No.: US 7,913,957 B2
(45) Date of Patent: *Mar. 29, 2011

(54) MOUNTING DEVICE AND APPARATUS FOR USE WITH STUDS COMPRISING T-SHAPED CHANNELS

(75) Inventors: Kevin Larry Nelson, Cumming, GA (US); James Thomas Pykett, Nottinghamshire (GB)

(73) Assignee: Panduit Corp., Tinley Park, IL (US)

( * ) Notice: Subject to any disclaimer, the term of this patent is extended or adjusted under 35 U.S.C. 154(b) by 799 days.

This patent is subject to a terminal disclaimer.

(21) Appl. No.: 11/744,000

(22) Filed: May 3, 2007

(65) Prior Publication Data
US 2007/0257159 A1 Nov. 8, 2007

Related U.S. Application Data

(60) Provisional application No. 60/746,711, filed on May 8, 2006.

(51) Int. Cl.
*F16L 3/08* (2006.01)
(52) U.S. Cl. .................. 248/71; 248/65; 248/73
(58) Field of Classification Search .......... 248/68.1, 248/56, 61, 71, 73, 49, 222.51, 222.52, 499, 248/500, 74.3, 65
See application file for complete search history.

(56) References Cited

U.S. PATENT DOCUMENTS

| | | | |
|---|---|---|---|
| 4,353,519 A | 10/1982 | Bogart | |
| 4,542,871 A * | 9/1985 | Fortsch | 248/73 |
| 4,662,590 A * | 5/1987 | Hungerford, Jr. | 248/72 |
| 4,697,774 A | 10/1987 | Sarton et al. | |
| 4,889,299 A | 12/1989 | Sarton et al. | |
| 4,896,851 A | 1/1990 | Shaull | |
| 5,271,586 A * | 12/1993 | Schmidt | 248/58 |
| 5,873,550 A * | 2/1999 | Phillips | 248/73 |
| 6,076,781 A * | 6/2000 | Kraus | 248/73 |
| 6,554,232 B1* | 4/2003 | Macris | 248/71 |
| 6,880,788 B2* | 4/2005 | Stephen | 248/68.1 |
| 7,527,226 B2* | 5/2009 | Kusuda et al. | 248/71 |
| 2006/0131812 A1* | 6/2006 | Caruso | 273/407 |

FOREIGN PATENT DOCUMENTS

IT 1108759 A 12/1985

OTHER PUBLICATIONS

Bosch Catalog pp. 6-7; 6-12; 10-7; and 11-7, date unknown.

* cited by examiner

*Primary Examiner* — Gwendolyn Baxter
(74) *Attorney, Agent, or Firm* — Robert A. McCann; Christopher S. Clancy

(57) ABSTRACT

An mounting device and apparatus for use with a stud comprising a channel comprises a mount and opposing flanges or an engagement member. The engagement member may geometrically conform to the shape of the channel for engaging the mounting device within the channel. The mount may comprise a socket for receiving and holding a cable management member. The engagement member may comprise an uneven surface to create an interference fit with internal portions of the stud that define the channel. The apparatus may further comprise a cable tie receiving device comprising a plurality of apertures for receipt of cable ties to organize cable bundles.

27 Claims, 10 Drawing Sheets

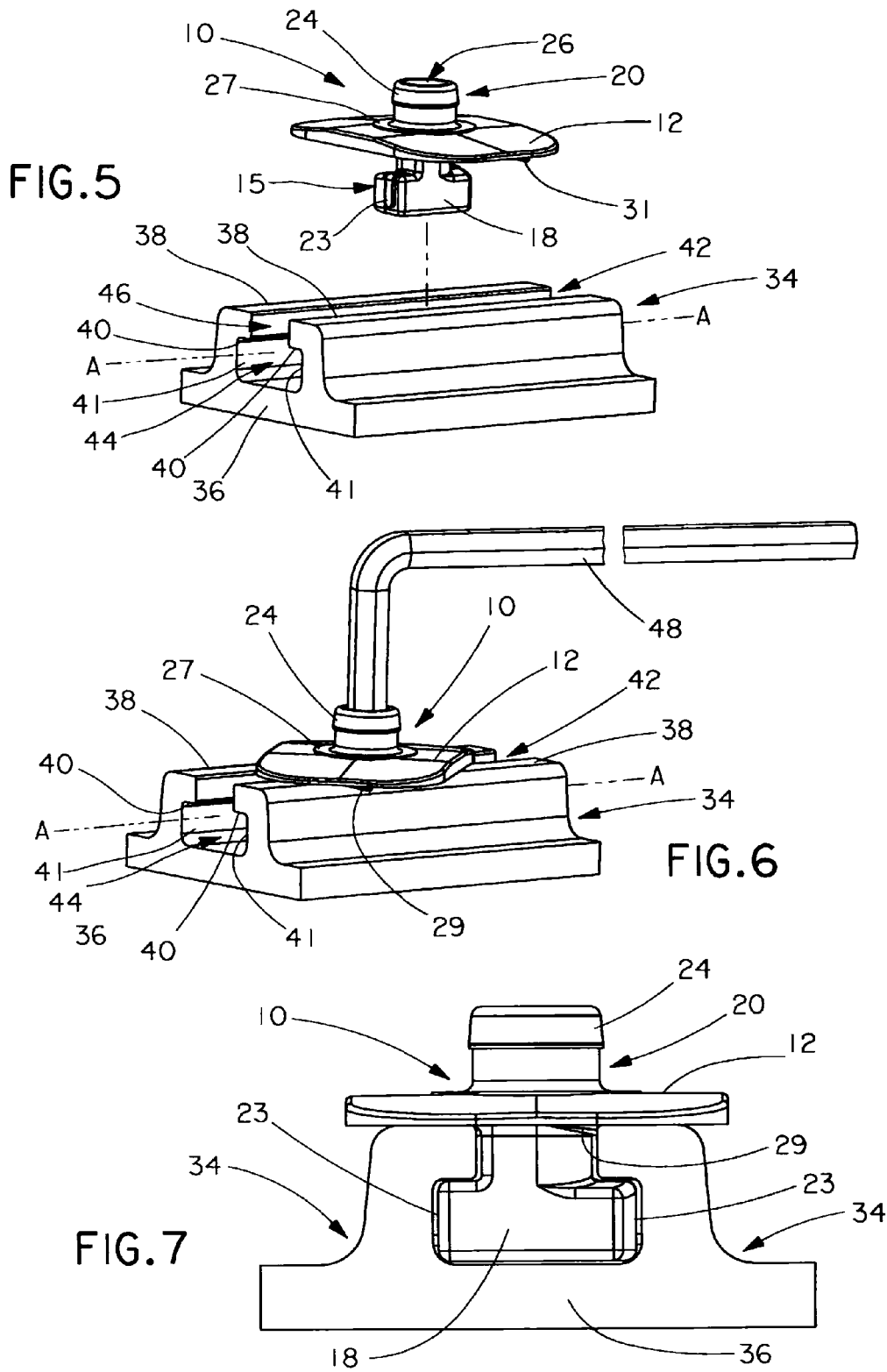

MOUNTING DEVICE AND APPARATUS FOR USE WITH STUDS COMPRISING T-SHAPED CHANNELS

FIELD OF INVENTION

This invention relates to a mounting device and apparatus for use with studs comprising channels and, more particularly, to such devices and apparatus for securing cable management devices to studs comprising T-shaped channels.

BACKGROUND

Mounting devices are often secured to a variety of structures for receiving and carrying items such as electrical equipment and cable bundles. In the rail, trucking and airplane industries, for example, mounting devices are secured to elongated studs positioned in various orientations on interior or exterior surfaces of railcars, trucks and aircraft. Since these studs typically comprise T-shaped channels which extend along a length of the stud, it is often desirable to secure the mounting devices to or within the T-shaped channel at a desired position to create a secure connection for receiving and carrying the aforementioned equipment or cables. It is also desirable to provide mounting devices that are easy and efficient to install.

SUMMARY OF THE INVENTION

The present invention relates to an improved mounting device and apparatus for use with studs comprising channels, particularly T-shaped channels.

In one embodiment, the mounting device is used with a stud comprising a T-shaped channel and comprises a plate comprising a top surface and a bottom surface, a mount extending from the top surface of the plate, the mount for receiving and carrying a cable management member and opposing flanges positioned on the bottom surface of the plate. The opposing flanges of this embodiment each comprise a stop surface to abut an internal side surface of the stud defining the T-shaped channel and engage the mounting device within the T-shaped channel.

In another embodiment, the mounting device is used with a stud comprising a channel and comprises a plate comprising a top surface and a bottom surface, a mount positioned on the top surface of the plate, the mount for receiving and carrying a cable management member and an engagement member that geometrically conforms to the shape of the channel for engaging the mounting device within the channel. The engagement member of this embodiment comprises an uneven surface positioned to create an interference fit between the engagement member and one or more portions of the stud defining tile channel. Further, the engagement member of this embodiment may be alternatively disposed in a first position, wherein the engagement member is capable of being moved alone a length of the channel and a second position, wherein the engagement member is capable of being engaged within the channel.

The mounting device may include various modifications and additional features. The mount may, for example, comprise a hexagonal socket for receipt of a tool for rotating the engagement member. The socket may also receive and carry a cable management member. The flange may comprise an inclined surface and the stop surface of the flange may be positioned transverse to the bottom surface of the plate. The engagement member may comprise a shaft and a wedge block, with the shaft connected to the bottom surface of the plate. The shaft may comprise at least one rounded corner and at least one square corner and the wedge block may comprise an uneven surface. The uneven surface may be transverse to a longitudinal axis of the channel with the engagement member engaged within the channel. The uneven surface typically comprises an angled surface or a flexible pad. This angled surface may comprise two angled surfaces comprising a lowest elevation point, wherein the lowest elevation point of one of the angled surfaces is positioned on an opposite side of the wedge block as the lowest elevation point of the other angled surface.

The present invention is also directed to a mounting apparatus for use with a stud comprising a channel. The mounting apparatus comprises a cable tie receiving device extending from a first end portion to a spaced apart second end portion, and a mounting device with at least some of the above-described features. The apparatus may accommodate placement of two or more mounting devices on studs with varying distances therebetween.

In one embodiment, the cable tie receiving device comprises a strip comprising a plurality of apertures for receiving cable ties, the strip positioned between the first and second end portions and at least one opening positioned at one or both of the first and second end portions. The mounting device of this embodiment comprises a mount for insertion into and engagement with the at least one opening, and an engagement member geometrically conforming to the shape of the channel. The mount is adapted to receive and carry a cable management member and the engagement member is adapted to engage the mounting device within the channel.

In another embodiment, the cable tie receiving device extends from a first end portion to a second end portion and comprises a plurality of apertures for receiving cable ties positioned between the first and second end portions. The cable tie receiving device further comprises at least one opening substantially larger than the plurality of apertures, positioned at one or both of the first and second end portions. The mounting device of this embodiment comprises a mount for insertion into and engagement with the at least one opening and an engagement member comprising a T-shaped cross-section, the engagement member for engaging the mounting device within the channel.

The apparatus may incorporate various additional features. The at least one opening of the cable tie receiving device may comprise an elongated opening comprising a first portion and a second portion, with the first portion comprising a larger width dimension than the second portion. The cable tie receiving device may further comprise opposing side rails positioned within the at least one opening. The first end portion may comprise two or more spaced apart openings for receiving two or more mounting devices. The mounting device of the mounting apparatus may also include one or more of the features found in the various embodiments of the mounting device described above.

BRIEF DESCRIPTION OF DRAWINGS

Certain embodiments of the present invention are illustrated by the accompanying figures. It should be understood that the figures are not necessarily to scale and that details not necessary for an understanding of the invention or that render other details difficult to perceive may be omitted. It should be understood, of course, that the invention is not necessarily limited to the particular embodiments illustrated herein.

FIG. 5 is a top perspective view of the mounting device of FIG. 1 aligned to be inserted into a T-shaped channel formed within a stud;

FIG. 6 is a top perspective view of the mounting device of FIG. 5 positioned within the T-shaped channel and partially rotated with the use of a tool engaged with the mounting device:

FIG. 7 is an end view of the mounting device locked into place within the T-shaped channel:

DETAILED DESCRIPTION

Figure 1:
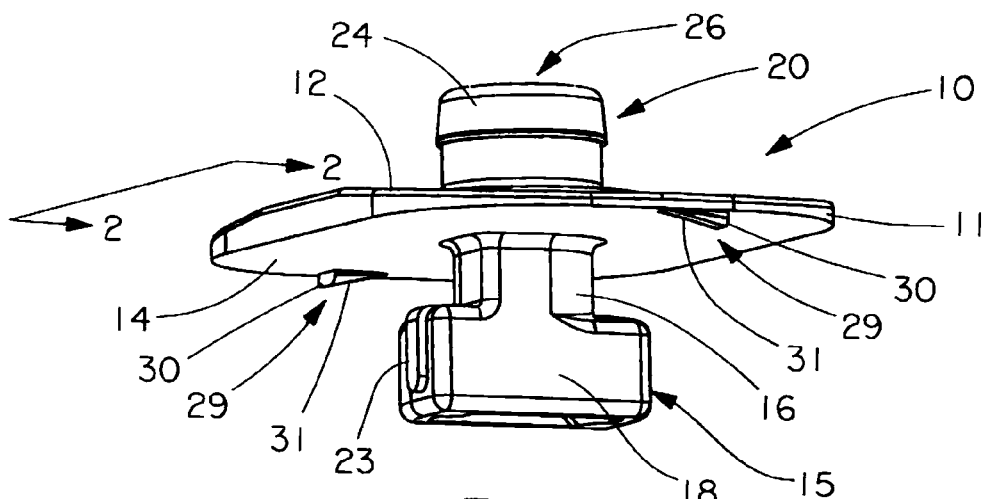
FIG. 1 is a bottom perspective view of the mounting device of the present invention.

Referring generally to FIGS. 1-4, one embodiment of the mounting device 10 of the present invention is shown. Mounting device 10 comprises plate 11 comprising top surface 12 and bottom surface 14, engagement member 15 (comprising shaft 16 and elongated wedge block 18), mount 20 and elastomeric pads 23.

Mount 20 extends from top surface 12 of plate 11 and may comprise annular shoulder 24, socket 26 (see FIG. 4) and collar 27. Mount 20, as will be discussed in more detail herein below, receives and secures cable management accessories to mounting device 10. Additionally, socket 26 is adapted to receive a tool, such as an alien wrench, to impart torque to mounting device 10. Imparting torque to mounting device 10 rotates wedge block 18 thereby securing or unlocking mounting device 10 to or from a T-shaped rail of a stud which forms part of a wall of a railcar, as shown in FIGS. 5-7.

Figure 4:
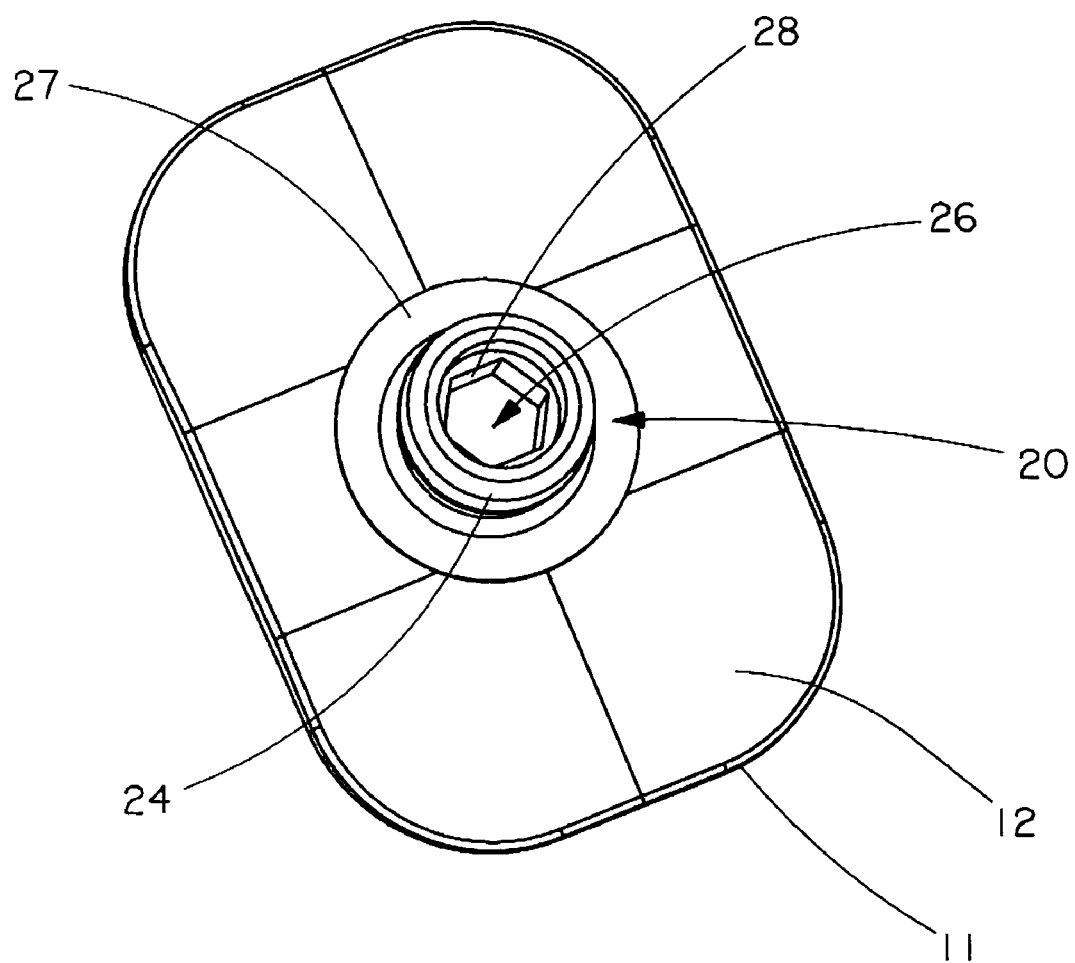
FIG. 4 is an enlarged top perspective view of the mounting device of FIG. 1.

Referring now to FIG. 4, socket 26 comprises internal sidewalls 28 which, in the example shown, form a hexagonal shape. This hexagonal shape is compatible for receiving an alien wrench. Other shapes formed by internal walls 28, such as square or spline, for example, are likewise contemplated.

Engagement member 15 may comprise shaft 16 and elongated wedge block 18. As described more fully hereinbelow, engagement member 15 typically geometrically conforms to the shape of the channel of the stud with which mounting device 10 is used and often exhibits a T-shaped cross-section. Engagement member 15 may be alternatively disposed in a first position, wherein the engagement member is capable of being moved along a length of the channel and a second position, wherein the engagement member is capable of being engaged within the channel. Shaft 16 typically comprises a smaller width dimension than block 18.

With continuing reference to FIGS. 1-4, shaft 16 extends between bottom surface 14 of plate 11 and elongated wedge block 18. Bottom surface 14 may further comprise opposing flanges 29, each having a stop surface 30 and an inclined surface 31. Stop surface 30 is generally transverse to bottom surface 14 (typically perpendicular thereto) and prevents removal of mounting device 10 once installed by engaging the internal side surfaces of a stud, as discussed below. Inclined surface 31 extends between stop surface 30 and bottom surface 14 at an incline to allow flanges 29 to ride up and over the external top surfaces of a stud during installation, as described below.

Figure 3:
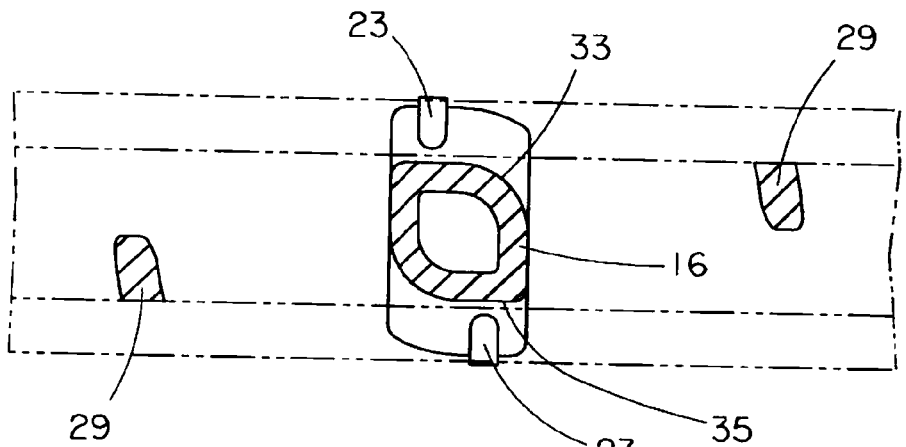
FIG. 3 is a cross sectional view taken along line 3-3 of FIG. 2, with opposing boundaries of a T-shaped rail shown in phantom to which the adapter would be mounted.

As shown in FIG. 3, shaft 16 may comprise opposing pairs of rounded corners 33 and square corners 35. This geometry prevents mounting device 10 from being over-rotated in the clockwise direction during installation. As mounting device 10 is rotated past the installation position, square corners 35 will contact the internal side surfaces of a stud and prevent further rotation. However, in the counter-clockwise direction, the rounded corners 33 will allow the mounting device 10 to rotate.

Elongated wedge block 18 typically comprises a larger length dimension than width dimension and may comprise an uneven surface. The uneven surface is positioned to create an interference fit between the engagement member 15 and one or more portions of a stud defining a T-shaped channel.

Figure 2:
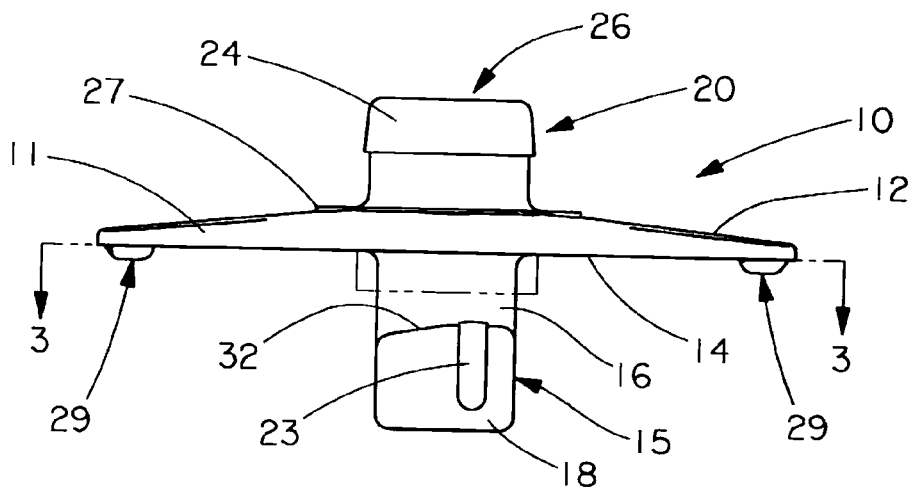
FIG. 2 is a side elevational view of the mounting device as seen along line 2-2 of FIG. 1.

The uneven surface may comprise angled surface 32 or elastomer pads 23. Elastomer pads 23 are positioned such that each pad 23 covers both the top and side surfaces of block 18. Angled surface 32 is positioned along an upper surface of block 18, as seen in FIG. 2. Another angled surface (not shown) is positioned in a corresponding location on the opposite side of block 18. Angled surface 32 and the angled surface that is not shown extend in opposite directions. That is, from the position of viewing FIG. 2, the lowest elevation of angled surface 32 is positioned on the left side of block 18 relative to the observer and the angled surface (not shown) has the lowest elevation positioned on the right side of block 18 relative to the observer. These angled surfaces may be angled between about 5° and about 20°, and more particularly at about 10°.

Mounting device 10 may be constructed of a rigid plastic material, such as a flame retardant nylon material. Elastomeric pads 23 may be constructed of a thermoplastic elastomer and injection molded with block 18 in a dual injection molding process. Likewise, cable management devices, discussed hereinafter, may be constructed of the same material as mounting device 10 and also injection molded.

Referring now to FIGS. 5-7, mounting device 10 is installed on stud 34. Stud 34 is typically used in railcars, truck or aircraft for mounting various items, including electrical equipment and cables. Stud 34 may be positioned in virtually any orientation, including on a ceiling. Stud 34 is generally an elongated structure comprising base 36, external top surfaces 38, internal top surfaces 40, internal side surfaces 41 and T-shaped channel 42. T-shaped channel 42 comprises base portion 44 and neck portion 46, wherein base and neck portions 44 and 46 run along the length or a portion of the length of stud 34.

A width dimension of base portion 44 of T-shaped channel 42 may be between about 0.50 inches and 2.0 inches and more particularly about 0.50 inches, 1.0 inch or 1.5 inches. A corresponding width dimension of neck portion 46 may be between about 0.25 inches and about 1.0 inch and more particularly about 0.43, 0.58 or 0.88 inches. Of course, if the dimensions of T-shaped channel 42 change, the dimensions of mounting device 10 may also change. Given the absolute dimensions provided herein, one of ordinary skill can readily calculate ratios for arriving at the appropriate dimensions.

Installation comprises a series of steps. Block 18 is oriented with its length dimension in alignment with the length dimension of T-shaped channel 42, as shown in FIG. 5. Shaft 16 is then passed through neck portion 46 and block 18 is placed in base portion 44, as shown in FIGS. 6 and 7. Once block 18 is positioned within T-shaped channel 42, it may be moved longitudinally up and down channel 42 into a desired position. Thereafter, installation tool 48 is inserted into socket 26 and turned clockwise 90° to rotate block 18 within T-shaped channel 42, as shown in FIG. 6.

As mounting device 10 rotates, block 18 is repositioned so that its length dimension is transverse to the length dimension of base portion 44 of T-shaped channel 42. During rotation, opposing elastomeric pads 23 of elongated block 18 contact internal top and side surfaces 40 and 41 of stud 34, ultimately creating a friction or interference fit. As rotation continues toward the approximate 90° position, inclined surface 31 will ride over external top surface of stud 34. Ultimately, each flange 29 will deflect downwardly into neck portion 46 such that the stop surfaces 30 engage the internal side surfaces 41 of stud 34, usually with an audible click. Further, an uneven surface may be positioned transverse to a longitudinal axis A of channel 42. In this configuration, shown in FIG. 7, mounting device 10 is secured to stud 34.

Once mounting device 10 has been installed on stud 34, various compatible cable management devices, including cable tie receiving devices 100, 200 and 300 (see FIGS. 8, 11, and 14), may be used therewith. These cable management accessories are adapted to receive and secure cables or cable bundles into position.

Figure 8:
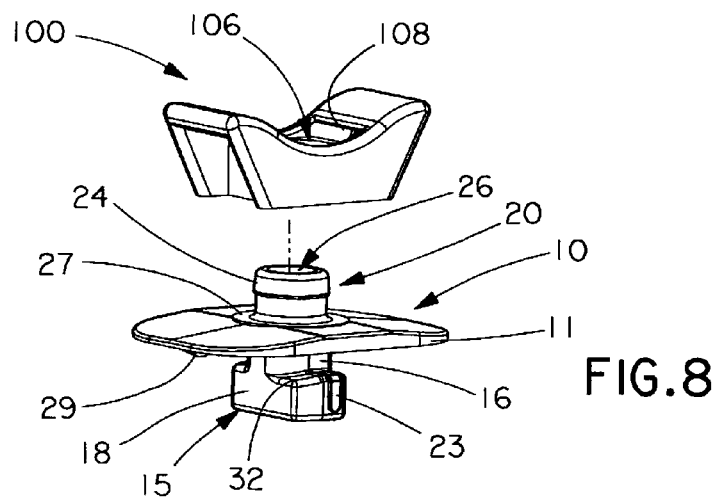
FIG. 8 is an exploded top perspective view of the mounting device of FIG. 1 and a first embodiment of a cable management accessory.
Figure 9:
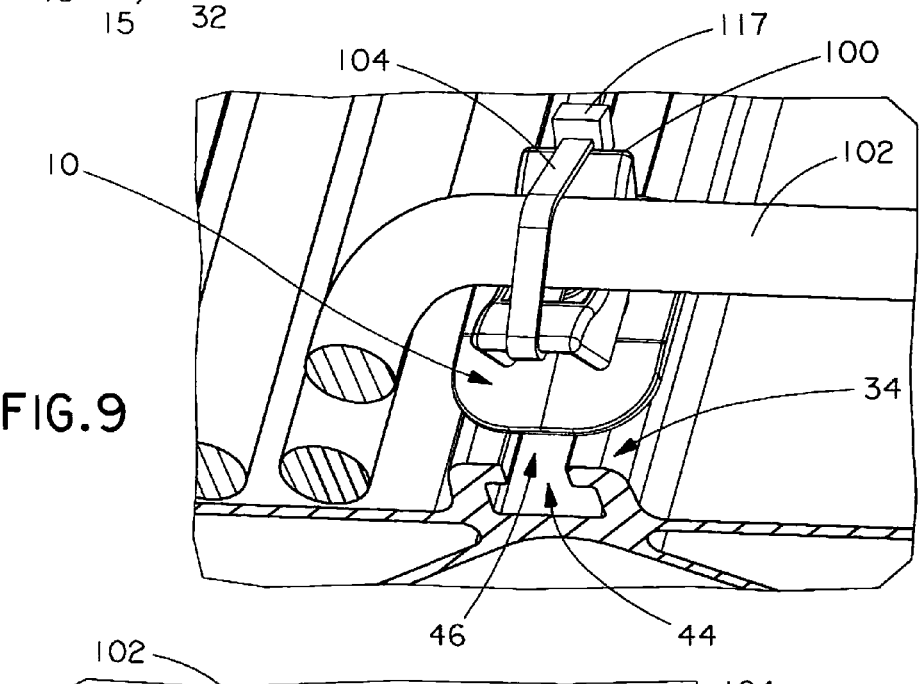
FIG. 9 is a top perspective and partially cut away view of the mounting device and accessory of FIG. 8 installed onto a stud comprising a T-shaped channel, with a cable secured thereto.
Figure 10:
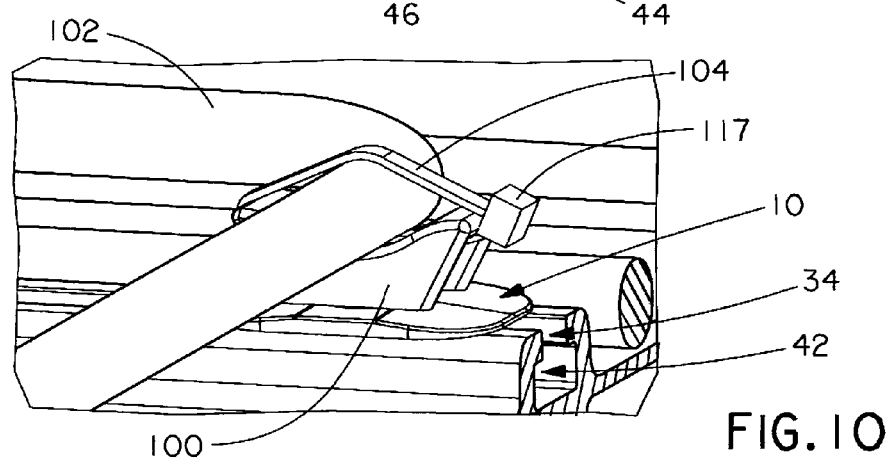
FIG. 10 is a side perspective and partially cut away view of FIG. 9.

As shown in FIGS. 8-10, cable tie receiving device 100, which receives and secures cables 102 with cable tie 104, may be secured to mount 20 of mounting device 10. Cable tie receiving device 100 comprises central opening 106 for receiving mount 20 and opposing slots 108 for receiving cable tie 104. Cable tie receiving device 100 is typically snap fit to mount 20. Cable tie receiving device 100 may be designed to swivel 360° to accommodate variable cable breakout angles. Once cable tie receiving device 100 is secured to mounting device 10, cable tie 104 may be threaded through opposing slots 108 and looped around cable 102 to secure cable 102 or cable bundles firmly into position, with head portion 117 in a locked state.

Mounting device 10 may also be used as part of a mounting apparatus, in connection with cable tie receiving devices 200 and 300, shown in FIGS. 11-12 and 13-14, respectively. Devices 200 and 300 share similar structures and are connected to two spaced apart mounting devices 10. Additionally, both devices 200 and 300 are adjustable in order to accommodate placement of mounting devices 10 on T-slots with varying distances therebetween. Specifically, cable tie receiving devices 200 and 300 can be mounted anywhere that mounting devices 10 can be installed about 100.0 mm to 500.0 mm apart and more particularly about 150.0 mm to about 300.0 mm apart. Devices 200 and 300 differ in the configuration of one of their end portions.

Figure 11:
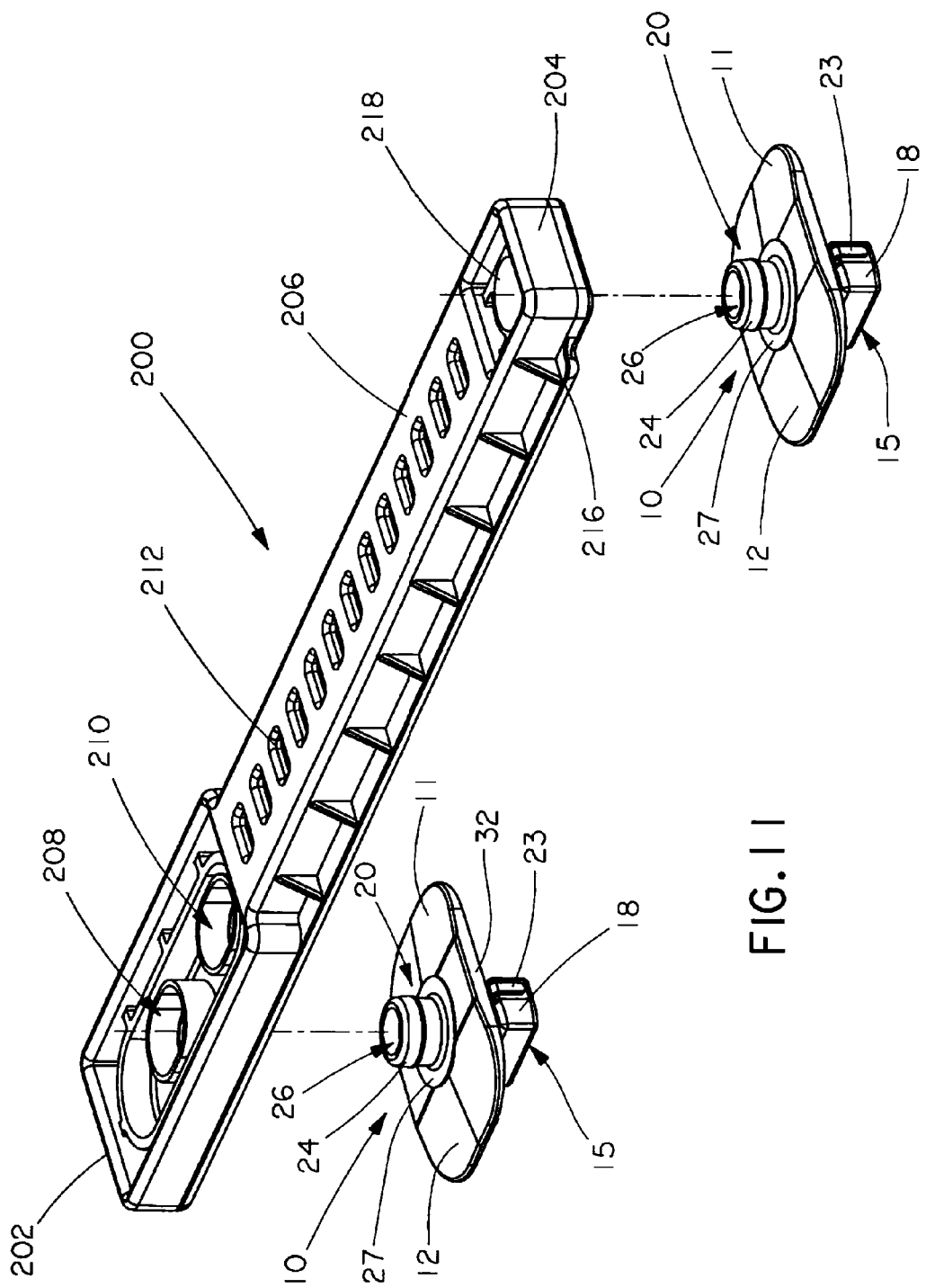
FIG. 11 is an exploded top perspective view of a mounting apparatus comprising a cable management device, shown with two mounting devices of the present invention.
Figure 12:
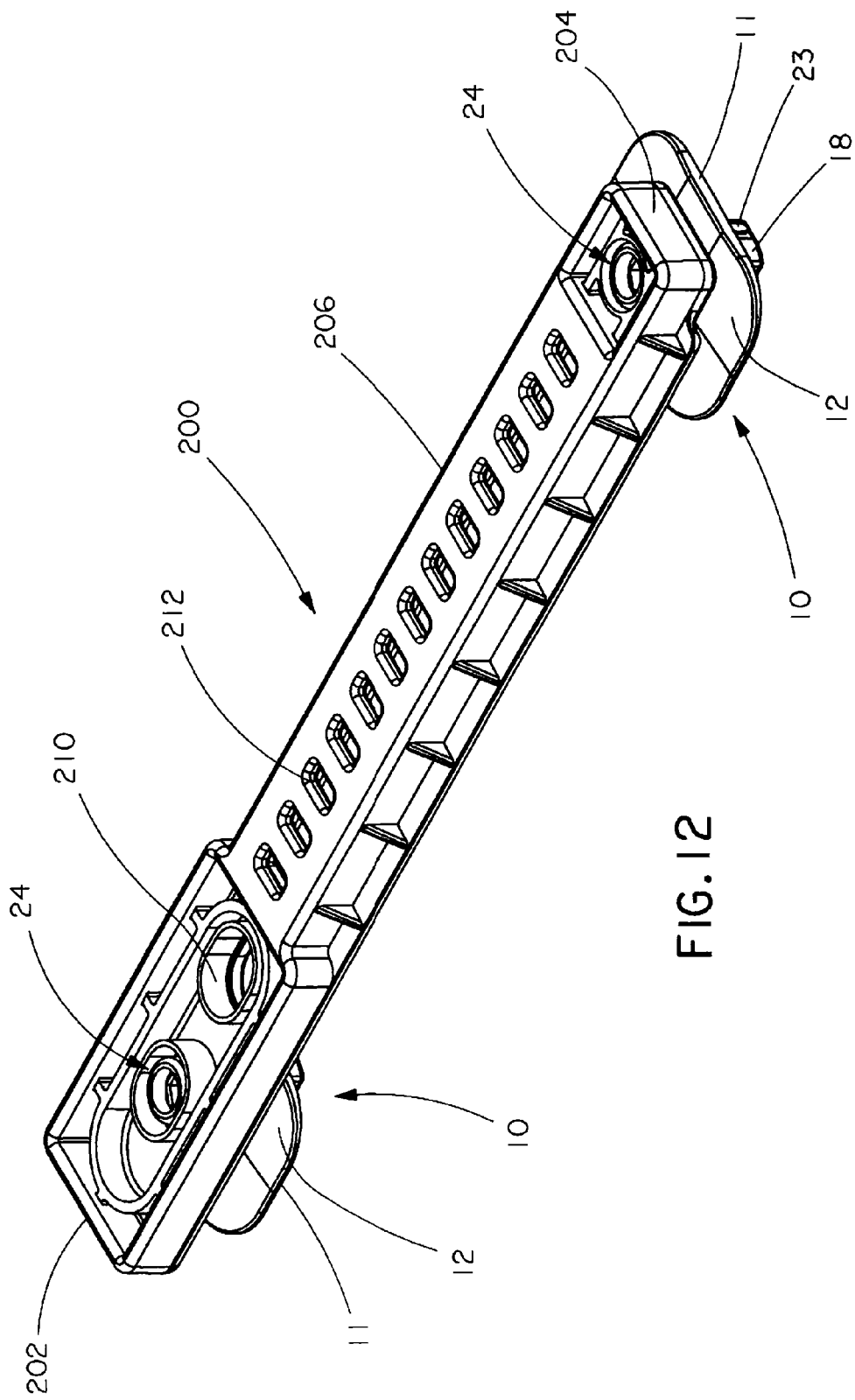
FIG. 12 is a top perspective view of the apparatus of FIG. 11, with the mounting devices secured to the cable management device.

FIGS. 11 and 12 illustrate cable tie receiving device 200, which comprises first end 202 and second end 204, with cable receiving strip 206 positioned therebetween. First end 202 comprises spaced apart first and second openings 208 and 210, each of which is adapted to receive mount 20 and engage annular shoulder 24 of a first mounting device 10. Strip 206 comprises a plurality of cable tie receiving slots 212 for receiving a plurality of cable ties 214 for securing cables 215 (see FIGS. 15 and 16) or cable bundles. Strip 206 may further comprise ribs 216 designed to reinforce and strengthen cable tie receiving device 200 and help prevent warping during injection molding. Strip 206 is typically between about 80.0 mm and about 300.0 mm in length and comprises between about 10 and 15 apertures. Second end 204 comprises third opening 218, for receiving mount 20 and engaging annular shoulder 24 of a second mounting device 10.

Figure 13:
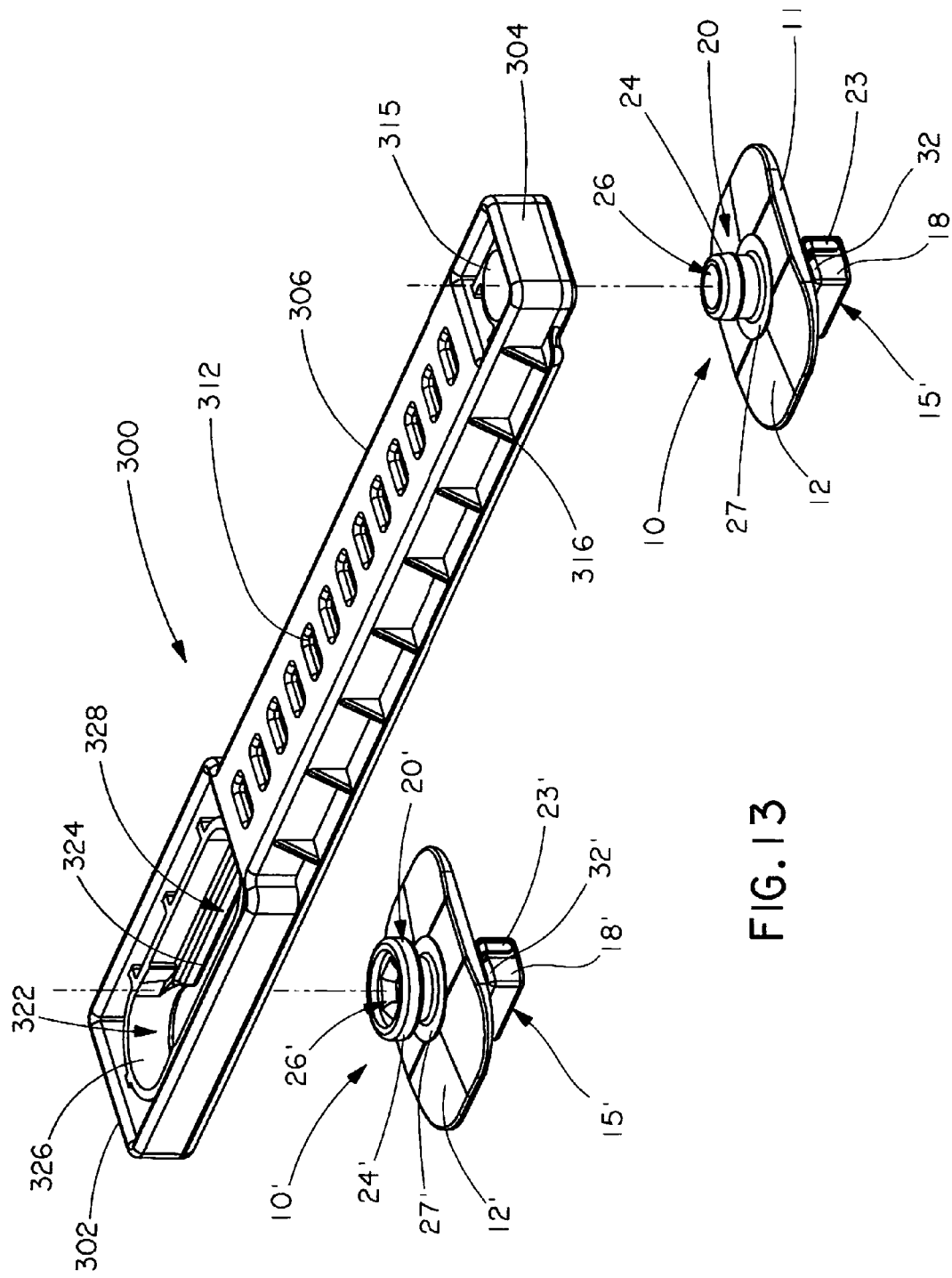
FIG. 13 is an exploded top perspective view of an alternate embodiment of the mounting apparatus of FIG. 11, comprising a cable management device and two mounting devices of the present invention.
Figure 14:
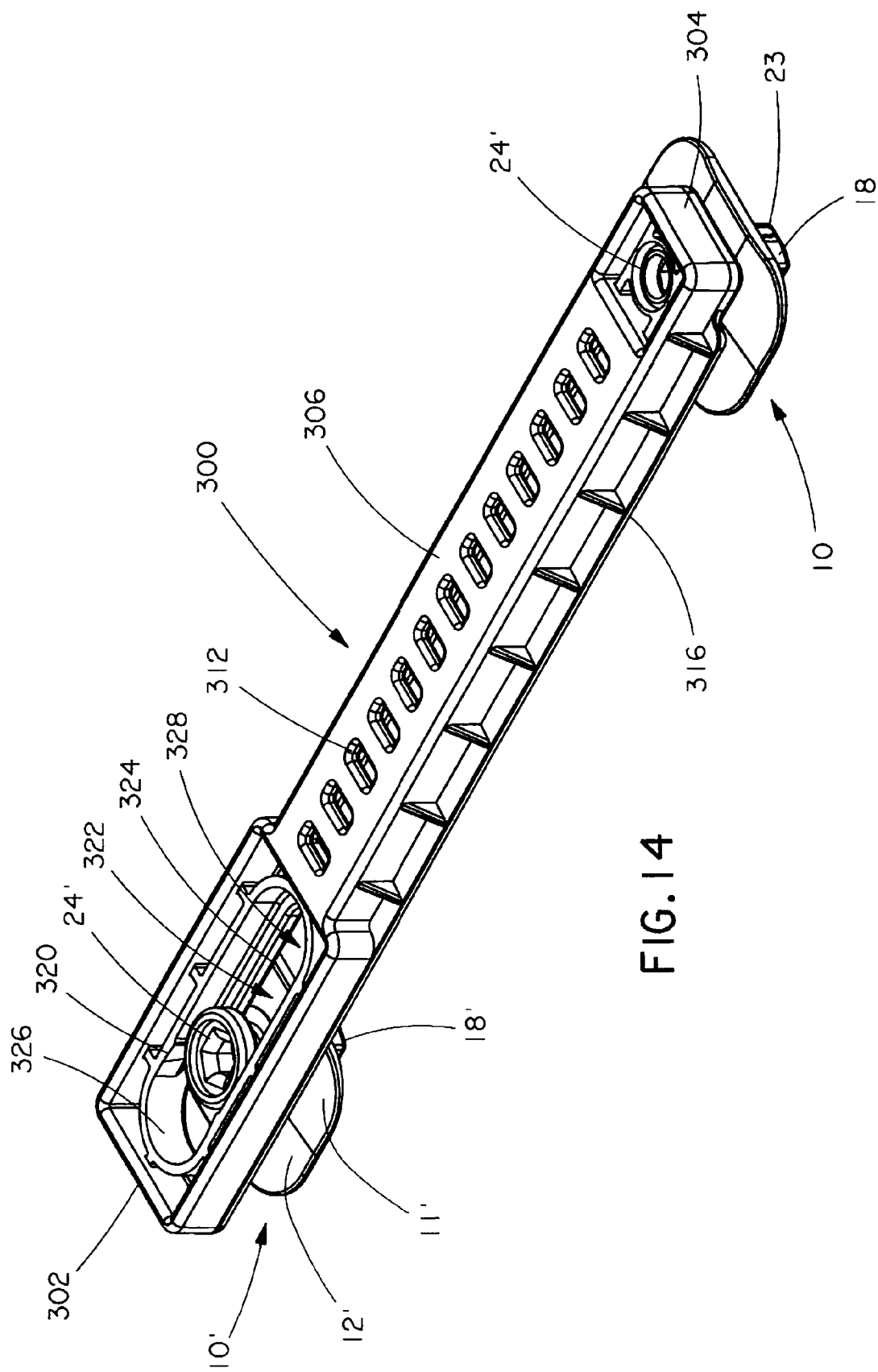
FIG. 14 is a top perspective view of the apparatus of FIG. 13, with the cable management device secured to the two mounting devices.

FIGS. 13 and 14 illustrate device 300, with like reference characters used in connection with device 200 corresponding to like components for device 300 (e.g., reference character 202 and 302 both correspond to first end, 204 and 304 correspond to second end, 206 and 306 correspond to strip, etc.). The difference between devices 200 and 300 relates to first end 302. Rather than first and second openings, first end 302 of cable tie receiving device 300 comprises keyhole arrangement 320, comprising elongated opening 322 and opposing side rails 324. First portion 326 of elongated opening 322 comprises a larger width dimension than second portion 328, owing to the presence of rails 324 within second portion 328. In addition, first portion 326 is adapted to receive alternate mounting device 10', which comprises the same structure as mounting device 10, except that mount 20' comprises a more pronounced annular shoulder 24'.

In operation, mounting devices 10, or mounting devices 10 and 10', are installed on studs 34 and devices 200 and 300 are connected and then utilized to carry and secure cables and cable bundles.

Installation of devices 200 and 300 is a two-step process. Mounting devices 10 or 10' are secured to T-shaped channels 42, as described above. With cable tie receiving device 200 in place, mounting devices 10 are secured to spaced apart T-shaped channels 42 in desired locations. One of first and second openings 208 and 210, as well as third opening 218, are aligned with mounts 20 of mounting devices 10 and snap fit into position. With cable tie receiving device 300 in place, mounting device 10' is secured to stud 34 in a desired position. First portion 326 of elongated opening 322 is aligned with mount 20 of mounting device 10', followed by inserting mount 20' into first portion 326 of opening 322. The user then adjusts the positioning of second end 304 of cable tie receiving device 300 to a desired location by moving second end 304, thereby allowing annular shoulder 24' to ride over rails 324. Mounting device 10 may then be installed in alignment with opening 318 at second end 304 and snap-fit therein. Alternatively, mounting device 10 may be installed prior to positioning of mounting device 10' in elongated opening 322.

Figure 15:
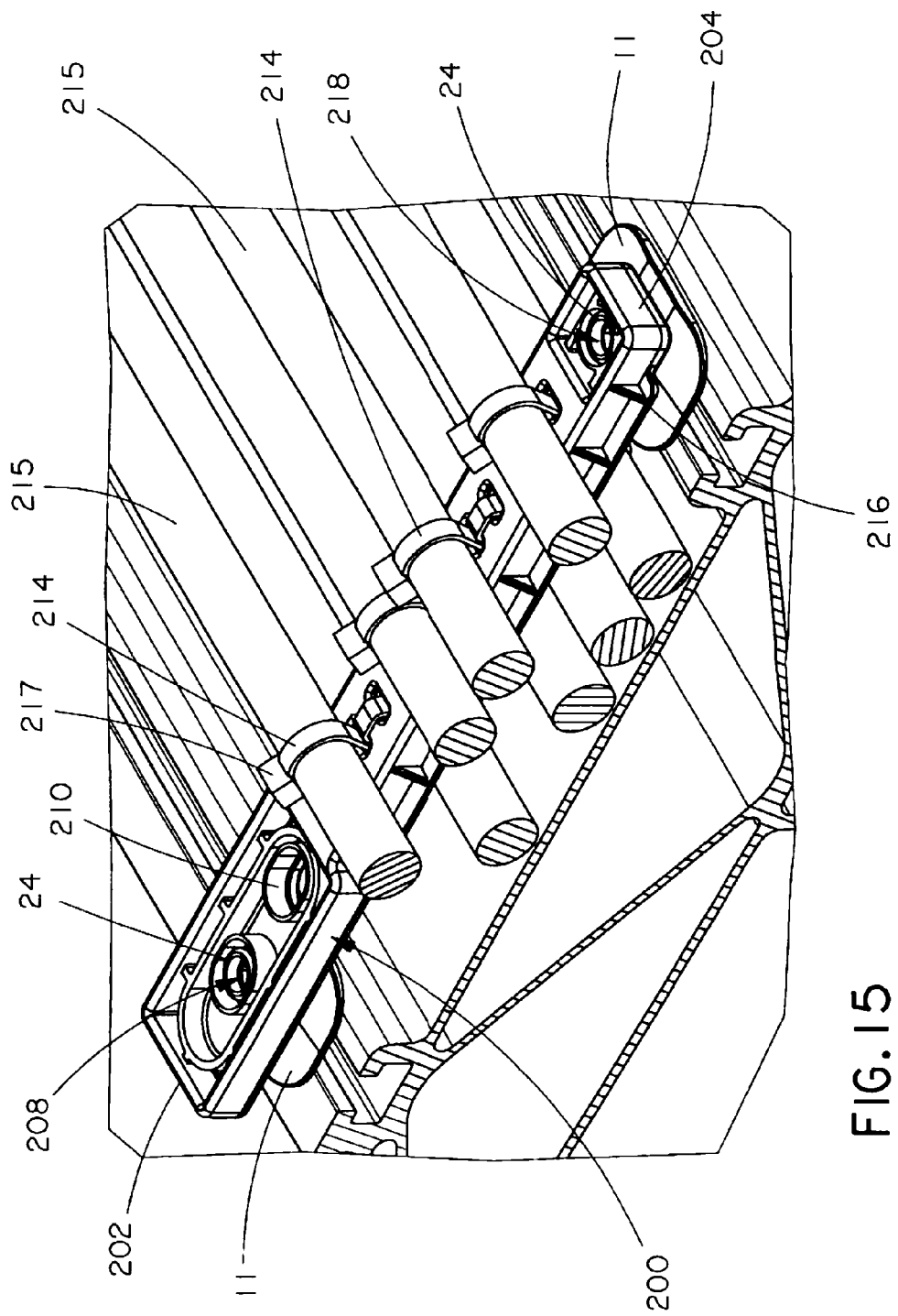
FIG. 15 is a top perspective and partially cut away view of the apparatus of FIG. 11 installed onto a wall utilizing two spaced apart T-shaped channels, wherein cables are secured to the accessory.
Figure 16:
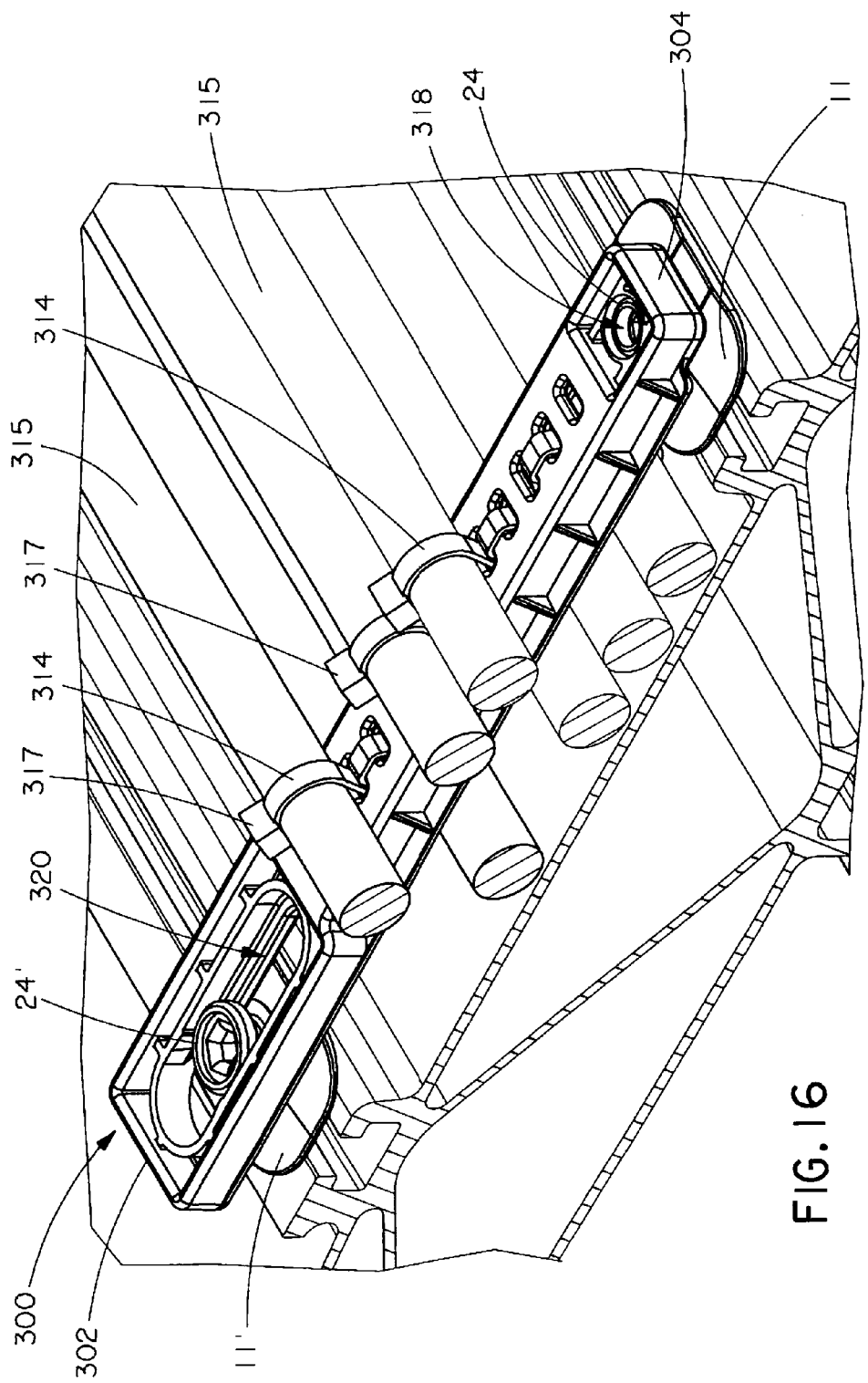
FIG. 16 is a top perspective and partially cut away view of the apparatus of FIG. 13 installed onto a wall utilizing two spaced apart T-shaped channels, wherein cables are secured to the accessory.

As shown in FIGS. 15 and 16, once devices 200 and 300 are installed, cable ties 214 and 314 may be used to secure cables 215 and 315 into position. Each cable tie receiving slot 212 and 312 may receive two cable ties 214 and 314, which may be secured around cables 215 and 315 and fled off at head portions 217 and 317.

While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation. The actual scope of the invention is intended to be defined in the following claims.

The invention claimed is:

1. A mounting device for use with a stud comprising a T-shaped channel, the mounting device comprising:
   a plate comprising a top surface and a bottom surface;
   a mount extending from the top surface of the plate, the mount for receiving and carrying a cable management member; and
   opposing flanges positioned on the bottom surface of the plate for engaging the mounting device within the T-shaped channel, each flange comprising a stop surface transverse to the bottom surface and an inclined surface extending from the stop surface to the bottom surface, wherein the stop surface is positioned to abut an internal side surface of the stud defining the T-shaped channel when the mounting device is engaged within the channel.

2. The mounting device of claim 1, wherein the mount comprises a hexagonal socket.

3. The mounting device of claim 1, wherein the mount comprises a socket for receipt of a cable management member.

4. The mounting device of claim 1, wherein the stop surface meets the inclined surface to form an apex.

5. The mounting device of claim 1, further comprising an engagement member comprising a T-shaped cross section and connected to the bottom surface of the plate, the engagement member for insertion into the T-shaped channel.

6. The mounting device of claim 5, wherein the engagement member comprises a shaft and a wedge block, the shaft connected to the bottom surface of the plate.

7. The mounting device of claim 6, wherein the shaft comprises at least one rounded corner and at least one square corner.

8. The mounting device of claim 6, wherein the wedge block comprises a top portion and a bottom portion and the top portion comprises an angled surface.

9. The mounting device of claim 8, wherein the angled surface comprises two angled surfaces each comprising a lowest elevation point, the lowest elevation point of one of the angled surfaces positioned on an opposite side of the wedge block as the lowest elevation point of the other angled surface.

10. The mounting device of claim 6, wherein the wedge block comprises a top portion and a bottom portion and the top portion comprises a flexible pad.

11. The mounting device of claim 1, wherein the inclined surface is positioned to ride over external surfaces of the stud.

12. A mounting device for use with a stud comprising a channel, the mounting device comprising:
   a plate comprising a top surface and a bottom surface;
   a mount positioned on the top surface of the plate, the mount for receiving and carrying a cable management member; and
   an engagement member geometrically conforming to the shape of the channel for engaging the mounting device within the channel, the engagement member comprising a shaft and a wedge block, the shaft connected to the bottom surface of the plate and the wedge block spaced apart from the bottom surface of the plate, the engagement member comprising an uneven surface positioned to create an interference fit between the engagement member and one or more portions of the stud defining the channel, the engagement member alternatively disposed in a first position, wherein the engagement member is capable of being moved along a length of the channel and a second position, wherein the engagement member is capable of being engaged within the channel.

13. The mounting device of claim 12, wherein the channel and the engagement member each comprise a T-shaped cross-section.

14. The mounting device of claim 12, wherein the uneven surface is transverse to a longitudinal axis of the channel with the engagement member engaged within the channel.

15. The mounting device of claim 12, wherein the uneven surface comprises a flexible pad for creating the interference fit.

16. The mounting device of claim 12, wherein the uneven surface comprises an angled surface.

17. The mounting device of claim 16, wherein the angled surface comprises two angled surfaces each comprising a lowest elevation point, the lowest elevation point of one of the angled surfaces positioned on an opposite side of the engagement member as the lowest elevation point of the other angled surface.

18. The mounting device of claim 12, wherein the shaft comprises at least one rounded corner and at least one square corner.

19. The mounting device of claim 12, wherein the wedge block comprises a top portion and a bottom portion and the top portion comprises the uneven surface.

20. The mounting device of claim 12, wherein the bottom surface of the plate comprises opposing flanges, each comprising a stop surface.

21. The mounting device of claim 20, wherein the flanges each comprise an inclined surface for riding over an external surface of the stud.

22. A mounting device for use with a stud comprising a T-shaped channel, the mounting device comprising:
   a plate comprising a top surface and a bottom surface;
   a mount comprising a hexagonal socket and extending from the top surface of the plate, the mount for receiving and carrying a cable management member;
   opposing flanges positioned on the bottom surface of the plate for engaging the mounting device within the T-shaped channel, each flange comprising a stop surface positioned to abut an internal side surface of the stud defining the T-shaped channel when the mounting device is engaged within the channel and;
   an engagement member comprising a T-shaped cross section and connected to the bottom surface of the plate, the engagement member for insertion into the T-shaped channel.

23. A mounting device for use with a stud comprising a T-shaped channel, the mounting device comprising:
   a plate comprising a top surface and a bottom surface;
   a mount extending from the top surface of the plate, the mount for receiving and carrying a cable management member;
   opposing flanges positioned on the bottom surface of the plate for engaging the mounting device within the T-shaped channel, each flange comprising a stop surface positioned to abut an internal side surface of the stud defining the T-shaped channel when the mounting device is engaged within the channel; and
   an engagement member comprising a shaft and a wedge block, the engagement member further comprising a T-shaped cross section and connected to the bottom surface of the plate, the engagement member for insertion into the T-shaped channel, said shaft connected to the bottom surface of the plate and said wedge block comprising a top portion and a bottom portion, the top portion comprising at least two angled surfaces, each comprising a lowest elevation point, the lowest elevation point of one of the angled surfaces positioned on an opposite side of the wedge block as the lowest elevation point of the other angled surface.

24. The mounting device of claim 23, wherein the shaft comprising at least one rounded corner and at least one square corner.

25. The mounting device of claim 23, wherein the top portion of the wedge block comprises a flexible pad.

26. A mounting device for use with a stud comprising a channel, the mounting device comprising:
   a plate comprising a top surface and a bottom surface;
   a mount positioned on the top surface of the plate, the mount for receiving and carrying a cable management member; and
   an engagement member geometrically conforming to the shape of the channel for engaging the mounting device within the channel, the engagement member comprising an uneven surface comprising a flexible pad positioned to create an interference fit between the engagement member and one or more portions of the stud defining the channel, the engagement member alternatively disposed in a first position, wherein the engagement member is capable of being moved along a length of the channel and a second position, wherein the engagement member is capable of being engaged within the channel.

27. A mounting device for use with a stud comprising a T-shaped channel, the mounting device comprising:
   a plate comprising a top surface and a bottom surface;
   a mount extending from the top surface of the plate, the mount for receiving and carrying a cable management member;
   opposing flanges positioned on the bottom surface of the plate for engaging the mounting device within the T-shaped channel, each flange comprising a stop surface positioned to abut an internal side surface of the stud defining the T-shaped channel when the mounting device is engaged within the channel; and
   an engagement member comprising a T-shaped cross section and connected to the bottom surface of the plate, the engagement member for insertion into the T-shaped channel,
   wherein the engagement member comprises a shaft and a wedge block, the shaft connected to the bottom surface of the plate,
   wherein the wedge block comprises a top portion and a bottom portion and the top portion comprises a flexible pad.

* * * * *

UNITED STATES PATENT AND TRADEMARK OFFICE
CERTIFICATE OF CORRECTION

PATENT NO. : 7,913,957 B2
APPLICATION NO. : 11/744000
DATED : March 29, 2011
INVENTOR(S) : Kevin Larry Nelson et al.

Page 1 of 1

It is certified that error appears in the above-identified patent and that said Letters Patent is hereby corrected as shown below:

On the Title Page, Item (57), line 1 of the Abstract which reads "An mounting device and apparatus for use with a stud" should read "A mounting device and apparatus for use with a stud."

Column 9, line 9 which reads "comprising at least one rounded corner and at least one square" should read "comprises at least one rounded corner and at least one square."

Signed and Sealed this
Fifth Day of February, 2013

Teresa Stanek Rea
*Acting Director of the United States Patent and Trademark Office*